(12) United States Patent
Takemoto

(10) Patent No.: US 8,170,339 B2
(45) Date of Patent: May 1, 2012

(54) IMAGE PROCESSING APPARATUS AND IMAGE PROCESSING METHOD

(75) Inventor: Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 12/271,685

(22) Filed: Nov. 14, 2008

(65) Prior Publication Data

US 2009/0129677 A1    May 21, 2009

(30) Foreign Application Priority Data

Nov. 16, 2007    (JP) ................................ 2007-298582

(51) Int. Cl.
*G06K 9/00* (2006.01)
*G06K 9/36* (2006.01)

(52) U.S. Cl. .......................... 382/181; 382/291; 382/312

(58) Field of Classification Search .................. 382/113, 382/181–231, 276–319
See application file for complete search history.

(56) References Cited

U.S. PATENT DOCUMENTS

| | | | |
|---|---|---|---|
| 3,643,069 A * | 2/1972 | Kikuchi ..................... 235/454 |
| 4,337,394 A * | 6/1982 | Fukushima ................ 250/237 G |
| 4,633,507 A * | 12/1986 | Cannistra et al. ............. 382/175 |
| 4,985,930 A * | 1/1991 | Takeda et al. ................. 382/306 |
| 5,138,670 A * | 8/1992 | Nakajima et al. ............. 382/282 |
| 5,153,928 A * | 10/1992 | Iizuka .......................... 382/321 |
| 5,274,468 A * | 12/1993 | Ojha ............................ 358/448 |
| 5,304,787 A * | 4/1994 | Wang ....................... 235/462.09 |
| 5,454,054 A * | 9/1995 | Iizuka .......................... 382/321 |
| 5,541,396 A * | 7/1996 | Rentsch ....................... 235/454 |
| 5,625,770 A * | 4/1997 | Nomura ....................... 707/822 |
| 6,116,507 A * | 9/2000 | Fukuda et al. ................ 235/454 |
| 6,650,776 B2 | 11/2003 | Ihara et al. |
| 6,671,421 B1 * | 12/2003 | Ogata et al. .................. 382/284 |
| 7,664,341 B2 * | 2/2010 | Takemoto et al. ............ 382/287 |
| 7,783,443 B2 * | 8/2010 | Aratani et al. ................. 702/94 |
| 7,847,844 B2 * | 12/2010 | Takemoto et al. ............ 348/286 |
| 2005/0168486 A1 * | 8/2005 | Sato et al. .................... 345/633 |

(Continued)

FOREIGN PATENT DOCUMENTS

JP    2000-082108 A    3/2000

OTHER PUBLICATIONS

Jun Rekimoto, "Matrix: A Realtome Object Identification and Registration Method for Augmented Reality", Proc. of Asia Pacific Computer Human Interaction(APCHI '98).

(Continued)

*Primary Examiner* — Manav Seth
(74) *Attorney, Agent, or Firm* — Carter, DeLuca, Farrell & Schmidt LLP

(57) ABSTRACT

For each image sensing device, an index in a sensed image is recognized, and layout information of the recognized index in a coordinate system based on an image sensing device that has acquired the sensed image is calculated. Index information including identification information unique to the index and the layout information of the index is managed. If recognition of a first index in a first sensed image acquired by a first image sensing device has failed, or the first index has erroneously been recognized, the index information of the first index is varied on the basis of the layout information of the first index calculated by the above process for a second sensed image acquired by a second image sensing device other than the first image sensing device.

8 Claims, 10 Drawing Sheets

U.S. PATENT DOCUMENTS

2007/0091125 A1* 4/2007 Takemoto et al. ............ 345/633
2007/0097435 A1* 5/2007 Terajima ...................... 358/1.16
2007/0139321 A1* 6/2007 Takemoto et al. .............. 345/87

OTHER PUBLICATIONS

E. Foxlin, et al., "VIS-Tracker: A Wearable Vision-Inertial Self Tracker", IEEE Conference on Virtual Reality, LA, CA, 2003.

Shin Aoki, "Super Resolution Processing by Plural number of lower Resolution Images", Richo Technical Report No. 24, Nov. 1998.

* cited by examiner

IMAGE PROCESSING APPARATUS AND IMAGE PROCESSING METHOD

BACKGROUND OF THE INVENTION

1. Field of the Invention

The present invention relates to a technique of obtaining the position and orientation information of an image sensing device using an image sensed by the image sensing device.

2. Description of the Related Art

There is a method of causing an image sensing device to sense a marker arranged at a known position in a coordinate system (reference coordinate system) provided as a reference in a three-dimensional space, and obtaining the position and orientation information of the image sensing device in the reference coordinate system in real time using the feature point coordinate values of a projected image in the sensed marker image.

A method disclosed in, e.g., non-patent reference 1 (see below) corresponds to this. The method disclosed in non-patent reference 1 uses a two-dimensional matrix code (marker) which is formed from a black frame and a black-and-white rectangular matrix including a two-dimensional barcode portion. In an image obtained by causing an image sensing device to sense the marker, the image coordinate values of four feature points of the black frame and the ID of the two-dimensional barcode portion are recognized. Furthermore, the relative position and orientation between the marker and the image sensing device is obtained, thereby estimating the position and orientation of the image sensing device in the reference coordinate system.

Another method is disclosed in non-patent reference 2 (see below), in which instead of obtaining a position and orientation based on only a sensed image, an image sensing device having an orientation sensor is used to sense two or more circular markers each containing a two-dimensional code, thereby obtaining the position and orientation of the image sensing device. This is a hybrid image sensing device position and orientation estimation method.

Alternatively, as disclosed in patent reference 1 (see below), a set, which has no outer shape, of points and patterns is used as a marker. In an image obtained by sensing the marker, four feature points combined with the patterns and the ID of the marker are recognized. Additionally, the relative position and orientation between the marker and the image sensing device is obtained, thereby obtaining the position and orientation of the image sensing device in the reference coordinate system.

In a still another method practiced in general, an image sensing device itself is fixed at a known position in real space. The image sensing device captures a marker fixed on a measurement target object which moves in the real space, thereby obtaining the position and orientation of the measurement target object in real time in the coordinate system of the image sensing device.

These prior art references aim at obtaining the position and orientation of the image sensing device itself or the measurement target object by obtaining the "relative position and orientation between the image sensing device and the marker" so that a CG corresponding to the position and orientation is superimposed on the sensed image in real time.

These prior art references also aim at obtaining the position and orientation of the image sensing device itself based on the image information of the marker sensed by the single image sensing device. The prior art references are listed below.

[Non-patent reference 1] Jun Rekimoto, "Matrix: A Real-time Object Identification and Registration Method for Augmented Reality", Proc. of Asia Pacific Computer Human Interaction (APCHI'98), 1998.

[Non-patent reference 2] E. Foxlin, Leonid Naimark, "VIS-Tracker: A Wearable Vision-Inertial Self Tracker", IEEE Conference on Virtual Reality, pp. 199-206, LA, CA. (2003).

[Patent reference 1] Japanese Patent Laid-Open No. 2000-082108.

The above-described marker includes "feature points" to obtain the relative position and orientation between the image sensing device and the marker, and a "two-dimensional barcode portion (identification information)" to assist marker recognition or identify a plurality of markers.

In the process of causing one image sensing device to recognize a marker, if the relative angle between the image sensing device and the marker is large, or the distance between the image sensing device and the marker is long, it may be impossible to recognize the marker because of its small identification area in the image even when "feature points" are recognizable. If the marker cannot be recognized, the "relative position and orientation between the image sensing device and the marker" cannot be obtained. The position and orientation of the image sensing device in the reference coordinate system cannot be obtained, either. This state is called an "identification area recognition failure".

<Causes of Identification Area Recognition Failure>

The major cause of the identification area recognition failure in the marker recognition process is the insufficient resolution of an index identification area to be used to identify the marker. For example, if the relative orientation between the image sensing device and the marker is deep, the resolution of the identification area is low. Conversely, if the relative orientation between the image sensing device and the marker is shallow, the resolution of the identification area is high. Hence, the deeper the relative orientation between the image sensing device and the marker is, the lower the marker recognition ratio in the marker recognition process can be. This is because an identification area with a low resolution causes a bit value recognition error or a read error of an adjacent bit value due to color smearing or noise upon image sensing.

Not only the relative orientation between the image sensing device and the marker but also a long distance between them, as described above, or a too small marker makes the projected image of the marker in the sensed image small, resulting in low resolution. This can cause a marker recognition failure.

When a marker whose identification area is in shadow of another object is sensed, the bit values included in the projected image of the marker in the sensed image may be different from those which should be. In this case, a read error of the bit values included in the identification area may occur. If a bit value read error occurs, marker recognition fails at a high possibility.

There are two types of marker recognition failures. One type is that the identification area cannot be recognized at all, and no marker can be registered. The other type is that the identification area is erroneously recognized as a marker of a wrong ID. The former failure will be called a "marker detection failure", and the latter will be called a "marker recognition error".

<Problem in Marker ID Recognition by a Plurality of Image Sensing Devices>

Assume that two fixed image sensing devices whose relative position and orientation is known sense a marker that expresses an ID by diving its area. Assume that marker recognition in the image sensed by one image sensing device succeeds, whereas marker recognition in the image sensed by the other image sensing device fails because of the "identification area recognition failure".

Conventionally, the marker recognition process is independently done in the image obtained by each image sensing device. For this reason, when "feature points" in the image sensed by one of the image sensing devices are recognized, only the position and orientation, in the reference coordinate system, of the image sensing device which has succeeded in recognizing the marker is obtained. The position and orientation of the other image sensing device which has failed in marker recognition cannot be obtained.

SUMMARY OF THE INVENTION

The present invention addresses the above-described problems, and provides a technique of raising the marker recognition ratio when sensing a marker using a plurality of image sensing devices and obtaining the position and orientation information of each image sensing device using the sensed marker.

According to one aspect of the present invention, an image processing apparatus connected to a plurality of image sensing devices each of which senses physical space where a plurality of indices are arranged, comprises: a calculation unit which, for each image sensing device, recognizes an index in a sensed image and calculates layout information of the recognized index in a coordinate system based on an image sensing device that has acquired the sensed image; a management unit which manages index information including identification information unique to the index and the layout information of the index; and a varying unit which, if recognition of a first index in a first sensed image acquired by a first image sensing device has failed, or the first index has erroneously been recognized, varies the index information of the first index managed by the management unit on the basis of the layout information of the first index calculated by the calculation unit for a second sensed image acquired by a second image sensing device other than the first image sensing device.

According to one aspect of the present invention, an image processing method executed by an image processing apparatus connected to a plurality of image sensing devices each of which senses physical space where a plurality of indices are arranged, comprises: recognizing, for each image sensing device, an index in a sensed image and calculating layout information of the recognized index in a coordinate system based on an image sensing device that has acquired the sensed image; managing index information including identification information unique to the index and the layout information of the index; and if recognition of a first index in a first sensed image acquired by a first image sensing device has failed, or the first index has erroneously been recognized, varying the managed index information of the first index on the basis of the layout information of the first index for a second sensed image acquired by a second image sensing device other than the first image sensing device.

Further features of the present invention will become apparent from the following description of exemplary embodiments with reference to the attached drawings.

DESCRIPTION OF THE EMBODIMENTS

The preferred embodiments of the present invention will now be described in detail with reference to the accompanying drawings. Note that the embodiments will be described as examples of preferred arrangements of the present invention described in the appended claims, and the present invention is not limited to the embodiments to be described below.

This embodiment deals with the "marker detection failure". In the following embodiment, a "marker" is used as an example of an index. However, an element other than the "marker" is also usable as the "index".

Figure 1:
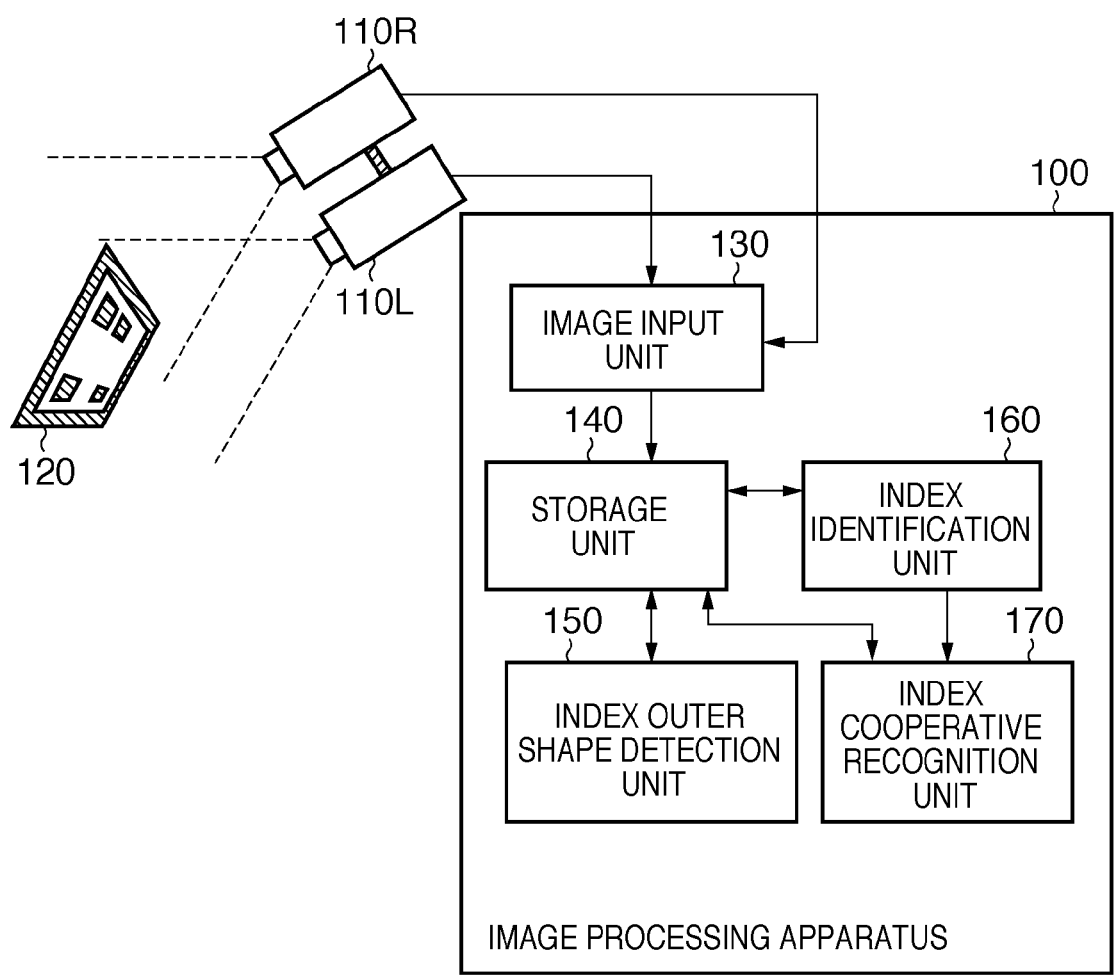
FIG. 1 is a block diagram showing the functional arrangement of a system according to the first embodiment of the present invention.

FIG. 1 is a block diagram showing the functional arrangement of a system according to this embodiment. As shown in FIG. 1, the system of this embodiment includes image sensing devices 110R and 110L whose relative position and orientation relationship is known (in FIG. 1, the relative position and orientation relationship between the image sensing devices is fixed), and an image processing apparatus 100.

The image sensing devices 110R and 110L will be described. The image sensing devices 110R and 110L sense physical space images (sensed images) to be provided to the right and left eyes of an observer, respectively. The sensed images are input to the image processing apparatus 100. At least one marker 120 is arranged in the physical space. For the descriptive convenience, assume that one marker 120 is arranged in the physical space, and the image sensing devices 110R and 110L sense the marker 120.

Figure 2:
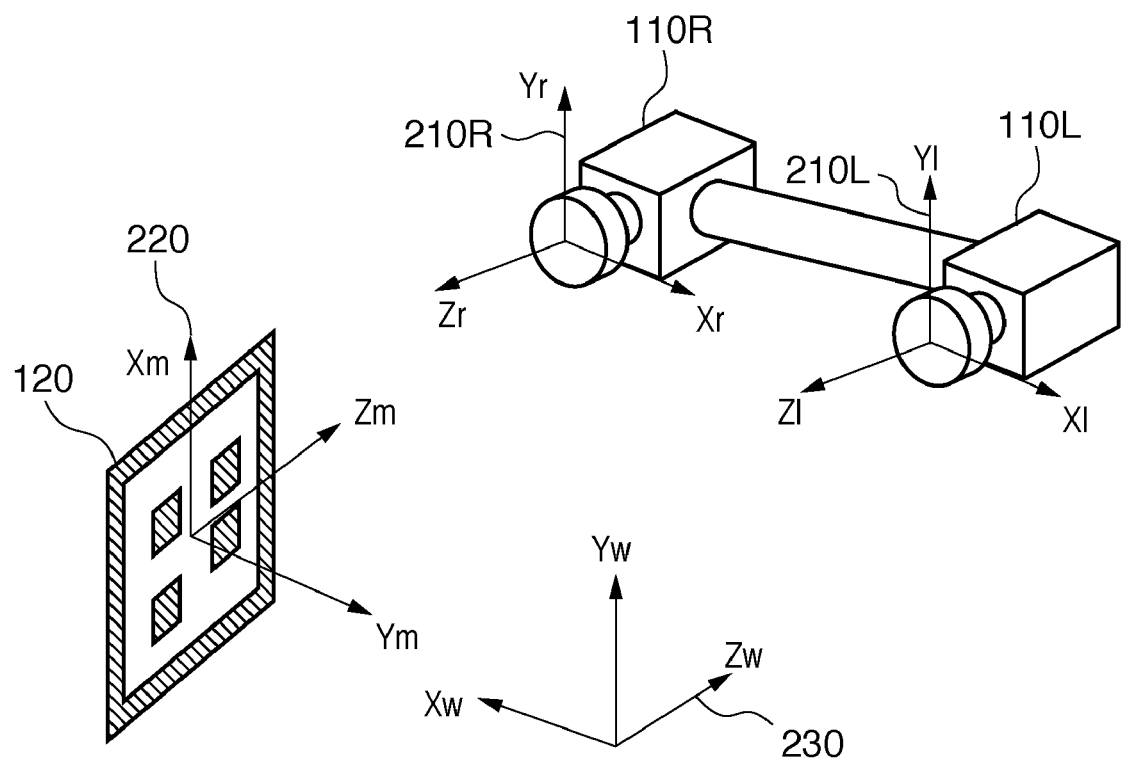
FIG. 2 is a view for explaining coordinate systems set for image sensing devices 110R and 110L and a marker 120.

FIG. 2 is a view for explaining coordinate systems set for the image sensing devices 110R and 110L and the marker 120.

A coordinate system 210R based on the image sensing device 110R is set for the image sensing device 110R. The coordinate system 210R has its origin at, e.g., the focal point of the image sensing device 110R. Three axes perpendicularly intersecting each other at the origin are defined as Xr-, Yr-, and Zr-axes.

A coordinate system 210L based on the image sensing device 110L is set for the image sensing device 110L. The coordinate system 210L has its origin at, e.g., the focal point of the image sensing device 110L. Three axes perpendicularly intersecting each other at the origin are defined as Xl-, Yl-, and Zl-axes.

A coordinate system 220 based on the marker 120 is set for the marker 120. The coordinate system 220 has its origin at, e.g., the central point of the marker 120. Three axes perpendicularly intersecting each other at the origin are defined as Xm-, Ym-, and Zm-axes.

Reference numeral 230 denotes a world coordinate system. The world coordinate system 230 has its origin at a point in the physical space, as is known. Three axes perpendicularly intersecting each other at the origin are defined as Xw-, Yw-, and Zw-axes.

As described above, the relative position and orientation relationship between the image sensing devices 110R and 110L is fixed. In FIG. 2, the image sensing device 110L is fixed at a position 60 mm in the positive direction of the Xr axis on the coordinate system 210R of the image sensing device 110R. The relative position and orientation relationship between the image sensing devices 110R and 110L is not particularly limited. The position and orientation relationship need only be known.

The marker 120 will be described next in more detail.

Figure 3:
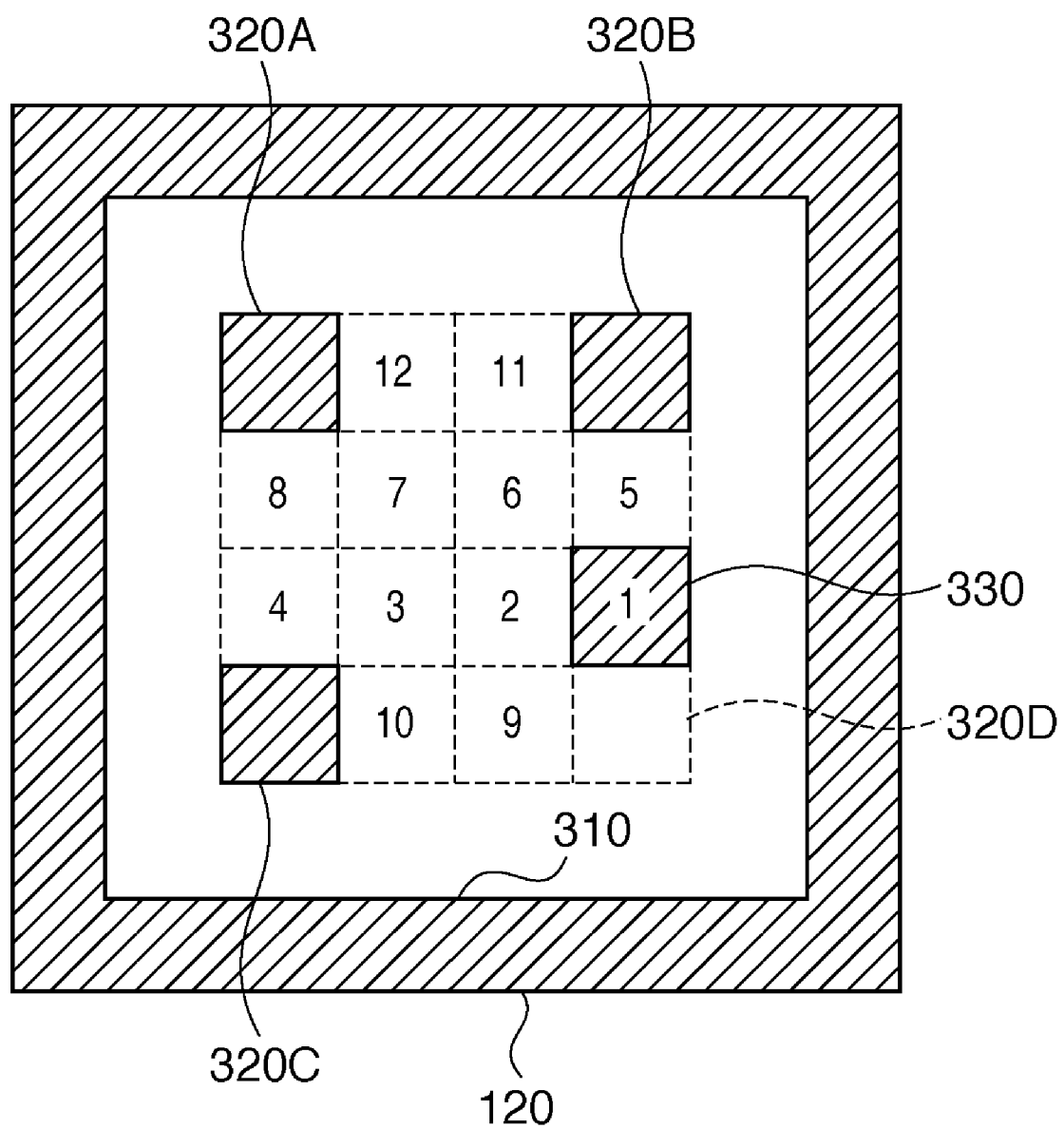
FIG. 3 is a view showing an example of the marker 120.

The marker 120 is a planar black-and-white two-dimensional matrix code that is arranged in the physical space to be sensed by the image sensing devices 110R and 110L. FIG. 3 is a view showing an example of the marker 120.

In this embodiment, a white square outer shape 310 is arranged on a black background, and a two-dimensional matrix code of 4×4 bits is arranged inside the square outer shape 310, as shown in FIG. 3. The 4×4 two-dimensional matrix code has, at its four corners, an upper left bit 320A, upper right bit 320B, lower left bit 320C, and lower right bit 320D to decide rotation in the normal direction of the marker 120, which are filled with black, black, black, and white, respectively.

An ID code area having information (ID) unique to the marker is formed in the 12-bit area except for the four corners of the 4×4 two-dimensional matrix code. Each area filled with black indicates "1", and each area filled with white indicates "0". In FIG. 3, each bit area has a numerical value to indicate the bit arrangement for convenience. FIG. 3 shows an example of a marker having an ID "1" by filling a corresponding bit 330 with black. Actually, the numerical values and the dotted lines indicating the bit area boundaries are not seen on the marker 120.

The marker 120 applicable to this embodiment is not limited to a marker having bit areas indicating a direction and ID in the white square outer shape as shown in FIG. 3. That is, any marker including a two-dimensional code as disclosed in non-patent references 1 and 2 is usable.

In this embodiment, the image sensing devices 110R and 110L sense the physical space including the above-described marker 120. The image sensing devices 110R and 110L are connected to the image processing apparatus 100.

The image processing apparatus 100 will be described next. The image processing apparatus 100 includes an image input unit 130, storage unit 140, index outer shape detection unit 150, index identification unit 160, and index cooperative recognition unit 170.

The image input unit 130 receives each of sensed images output from the image sensing devices 110R and 110L as an analog signal, converts it into digital data, and outputs it to the storage unit 140.

Figure 4:
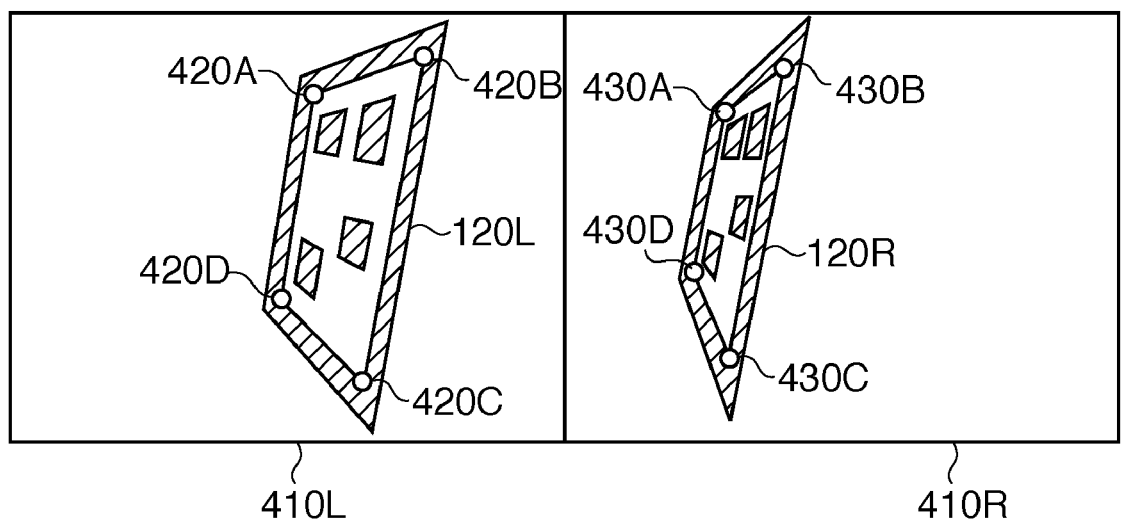
FIG. 4 is a view showing examples of images sensed by the image sensing devices 110R and 110L.

FIG. 4 is a view showing examples of images sensed by the image sensing devices 110R and 110L. The image sensing device 110L acquires a sensed image 410L. The image sensing device 110R acquires a sensed image 410R. The marker 120 in the sensed image 410L is a marker 120L. The marker 120 in the sensed image 410R is a marker 120R. The square outer shape 310 of the marker 120 on the sensed image has four corners 430A to 430D. The four corners 430A to 430D will be described later in detail.

Referring back to FIG. 1, the storage unit 140 stores the image data output from the image input unit 130 and also stores the following various kinds of data:

A list of IDs of markers arranged in the physical space;
The layout position and orientation and ID of each marker (in the world coordinate system) in the physical space;
A vertex coordinate value Ic and ID of a marker output from the index outer shape detection unit 150;
A projective transformation matrix Mp of each of the image sensing devices 110R and 110L;
Binary images generated by image processing (to be described later) from the sensed images acquired by the image sensing devices 110R and 110L;
Positions Vc of the four vertices of the marker in the world coordinate system;
A processed image T (normalized image) projected onto the square and used for the marker ID identification process.

It is noted that the pieces of information about the marker are stored in association with the ID of the marker.

The storage unit 140 stores known information to be explained later, and information that should be handled as known information for those skilled in the art in processing to be described later as well as the above-described data. The information stored in storage unit 140 can be read out and used as needed.

The index outer shape detection unit 150 reads out the sensed image from the storage unit 140 and detects the boundary line of the square outer shape 310 representing the outer shape of the marker 120 as a preprocess for recognition of the marker 120 in the readout sensed image. To detect the boundary line, for example, a boundary line detection method disclosed in non-patent reference 1 is used. More specifically, the sensed image is binarized to generate a binary image. Line fitting is performed for the boundary line of the square outer shape 310 in the generated binary image, and an area having a rectangular shape is defined as a marker candidate area. The coordinate positions Ic of the four vertices (320A to 320D) where four sides obtained by line fitting intersect on the sensed image are stored in the storage unit 140. The index outer shape detection unit 150 also stores, in the storage unit 140, the binary image generated by the outer shape detection process. The index outer shape detection unit 150 executes this process for each of the sensed images obtained by the image sensing devices 110R and 110L.

The index identification unit 160 reads out the sensed images and the coordinate positions Ic obtained by the index outer shape detection unit 150 from the storage unit 140. Using the readout data, the index identification unit 160 recognizes (identifies) the marker 120 in the sensed image. If recognition of the marker 120 has succeeded, a position and orientation Mcm of the marker 120 in the coordinate system 210L based on the image sensing device 110L is obtained.

To identify the marker, for example, a method disclosed in non-patent reference 1 is used. More specifically, a transformation matrix which projects the 4×4 code area to a square is obtained. The bit of each cell is determined on the basis of the ratio of black and white pixels in each cell area. The index identification unit 160 stores, in the storage unit 140, the normalized image T projected to a square by projective transformation for bit determination. The bit determination includes determination of the bits 320A to 320D serving as direction deciding bits to decide the direction of the marker. Additionally, the bit in the ID code area is determined in the direction defined by the bits 320A to 320D, thereby deciding the ID of the marker.

When marker identification is ended, the index identification unit 160 obtains the position and orientation Mcm of the marker 120 in the coordinate system 210L based on the image sensing device 110L using, e.g. a method disclosed in non-patent reference 1.

When calculating the position and orientation of the image sensing device 110R in the world coordinate system 230, first, an layout position and orientation Mwm of the marker in the world coordinate system 230, which correspond to the ID of the identified marker, is read out from the storage unit 140. Using the readout layout position and orientation Mwm and the obtained position and orientation Mcm, a position and orientation Mwc of the image sensing device 110R in the world coordinate system 230 is estimated.

Mwm, Mcm, and Mwc express 4×4 matrices each representing a position and orientation and satisfy $$Mwc = Mwm \cdot Mcm^{-1} \quad (1)$$

When marker recognition has succeeded, the position and orientation Mcm of the marker 120 in the coordinate system 210L is multiplied by three-dimensional positions Vm of four vertices 420A to 420D in the coordinate system 220. The three-dimensional positions Vc of the four vertices 420A to 420D of the marker in the coordinate system 210L are obtained and stored in the storage unit 140. The three-dimensional positions Vc are calculated by $$Vc = Mcm \cdot Vm \quad (2)$$

The index cooperative recognition unit 170 performs an operation of coping with a case in which the index identification unit 160 has succeeded in marker recognition in the image sensed by one image sensing device but has failed in marker recognition in the image sensed by the other image sensing device. The operation will be described below.

The three-dimensional coordinate values Vc of the four vertices of the marker whose recognition has succeeded are transformed into two-dimensional coordinate values Ip on the sensed image in which marker recognition has failed. If a plurality of markers are recognized in image sensing devices except an image sensing device that has failed in marker recognition, all marker vertices Vcn are transformed into two-dimensional coordinate values Ipn on an image plane. Examples of the case where "a plurality of markers are recognized in image sensing devices except an image sensing device that has failed in marker recognition" are a case where one image sensing device recognizes a plurality of markers, a case where a plurality of image sensing devices repeatedly recognize one marker, and a case where both situations simultaneously occur.

In this embodiment, if recognition of the marker 120 (other index) in the sensed image (other sensed image) obtained by the image sensing device 110R (other image sensing device) has failed, the following process is performed. First, the coordinate values Vc of the four vertices of the marker 120 in the coordinate system 210L (self coordinate system) based on the image sensing device 110L (image sensing device of interest) are acquired from the storage unit 140. The coordinate values Vc are transformed into a position and orientation Vc' of the marker 120 in the coordinate system 210R (other coordinate system) based on the image sensing device 11R. When the position and orientation relationship information representing the relative position and orientation relationship between the image sensing device 110R and the image sensing device 110L is defined as a position and orientation $M_{RL}$ of the coordinate system 210L in the coordinate system 210R, Vc' is given by $$Vc' = M_{RL} \cdot Vc \quad (3)$$

By using following equation (4), Vc' is projectively transformed onto the sensed image obtained by the image sensing device 110R to obtain a two-dimensional coordinate value Ic'.

$$Ic' = MP' \cdot Vc' \quad (4)$$

The transformation matrix MP' used in projective transformation is a matrix unique to each image sensing device. The transformation matrix MP' is obtained for each image sensing device and stored in the storage unit 140 in advance.

Of the thus obtained two-dimensional coordinate values, two points of the coordinate values Ic' of the set of the four vertices of one marker and the two-dimensional coordinate values Ic of the four vertices, which are closest on the image, are selected to make a set. The distance between the two points in the set is obtained. The average value of the distances obtained in the respective sets is calculated. If the calculated average value is smaller than a threshold value, it is determined that the coordinate values Ic' indicate the coordinate values of the four corners of a marker that is the same as the marker having the two-dimensional coordinate values Ic at the four corners. The coordinate values Ic' are registered in the storage unit 140 in association with the ID of the marker.

The index cooperative recognition unit 170 recognizes the marker 120 on the sensed image obtained by the image sensing device 110R based on the above-described processes of the index identification unit 160 using the coordinate values Ic' on the sensed image obtained by the image sensing device 110R. The above-described processes of the index identification unit 160 are executed using the recognized marker 120, thereby estimating the relative position and orientation between the image sensing device 110R and the marker 120.

This embodiment is not limited to the method of projecting the vertex information of a marker whose identification has succeeded onto the coordinate system of an image sensing device which has failed in marker identification. That is, any method of associating a marker whose recognition has failed with the information of a marker whose recognition has succeeded in the other image sensing device is usable.

For example, a method disclosed in non-patent reference 1 may be used. In this method, first, a two-dimensional projective transformation matrix (Homography) is obtained using the two-dimensional coordinate values of the vertices of a marker (marker candidate) and the fact that the marker vertices are the vertices of a square on a plane. The three-dimensional positions of the four vertices of the marker candidate are obtained from the two-dimensional projective transformation matrix by a known calculation method. The three-dimensional positions are compared with Vc using equation (2), thereby associating the marker candidate with a marker already recognized.

Alternatively, tracing an epipolar line traced from each vertex of the marker of the sensed image whose recognition has succeeded, a set of vertices of a corresponding marker candidate on the side of the image whose recognition has failed may be searched for to do association.

Figure 5:
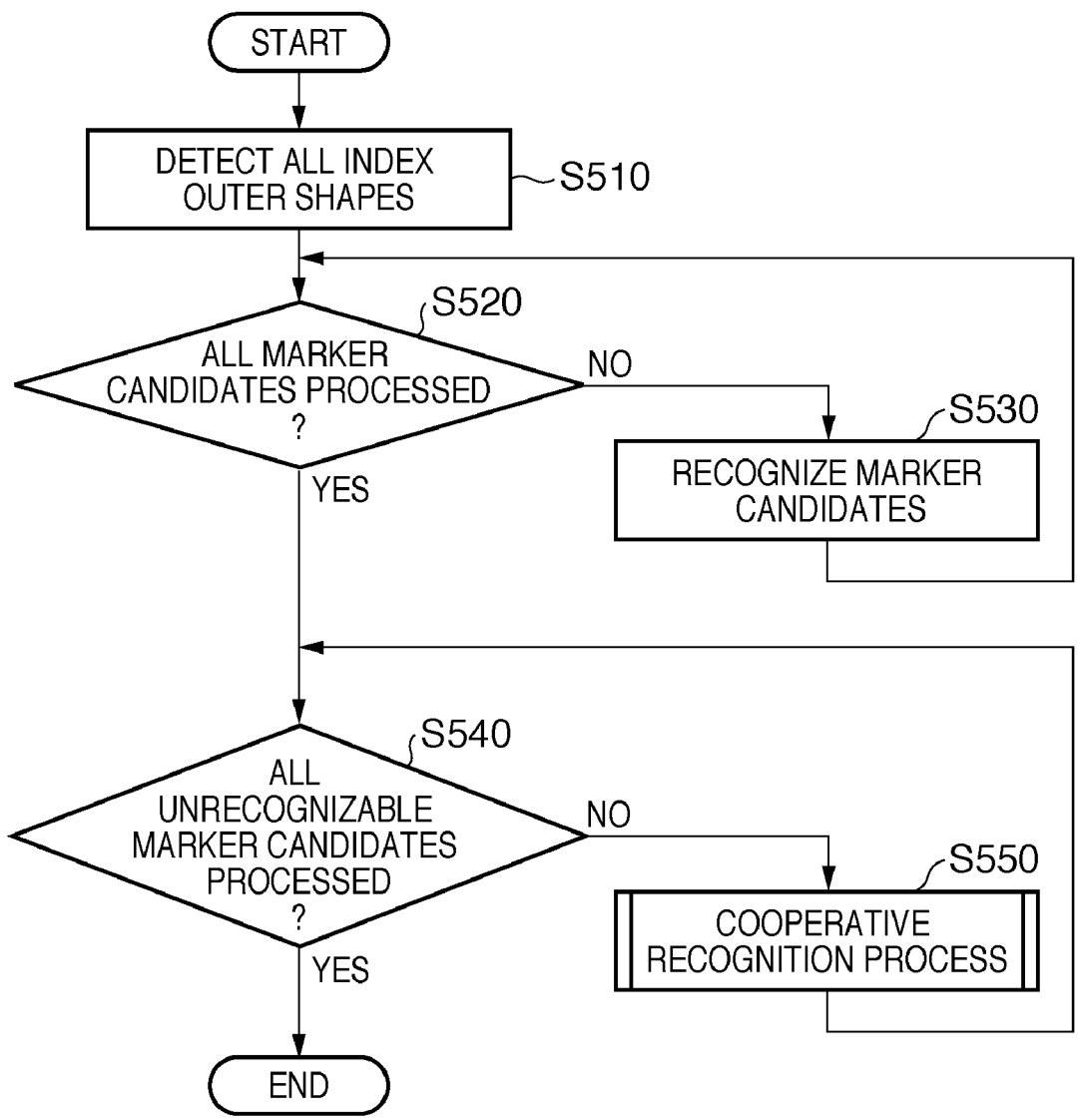
FIG. 5 is a flowchart of a process of recognizing markers in sensed images acquired by the image sensing devices 110R and 110L.

FIG. 5 is a flowchart of the process of recognizing markers in sensed images acquired by the image sensing devices 110R and 110L. The process according to the flowchart in FIG. 5 is executed as part of the process of obtaining the position and orientation information of the image sensing devices 110R and 110L using a recognized marker.

In step S510, the image input unit 130 outputs sensed images from the image sensing devices 110R and 110L to the storage unit 140 as digital data. The index outer shape detection unit 150 reads out each sensed image from the storage unit 140 and detects the boundary line of the square outer shape 310 which indicates the outer shape of the marker 120 in the readout sensed image. The index outer shape detection unit 150 stores, in the storage unit 140, the coordinate positions Ic (on the sensed image) of the four corners of the internal area of the detected outer shape.

In step S520, the index identification unit 160 reads out all sensed images from the storage unit 140 and determines whether the marker 120 in each sensed image is recognized. If it is determined that the marker 120 is not recognized yet in all sensed images, the process advances to step S530.

In step S530, the index identification unit 160 reads out the sensed images and the coordinate positions Ic obtained by the index outer shape detection unit 150 from the storage unit 140. Using the readout data, the index identification unit 160 recognizes (identifies) the marker 120 in the sensed image.

If the marker 120 is recognized in all sensed images, the process advances to step S540.

In step S540, the index cooperative recognition unit 170 determines whether there is a sensed image for which recognition of the marker 120 has failed. If it is determined that there is no sensed image for which recognition has failed, the process is ended. If there is a sensed image for which recognition has failed, the process advances to step S550.

In step S550, the index cooperative recognition unit 170 executes the marker recognition process again for the sensed image for which recognition has failed using the pieces of information about the marker whose recognition has succeeded (cooperative recognition process).

Figure 6:
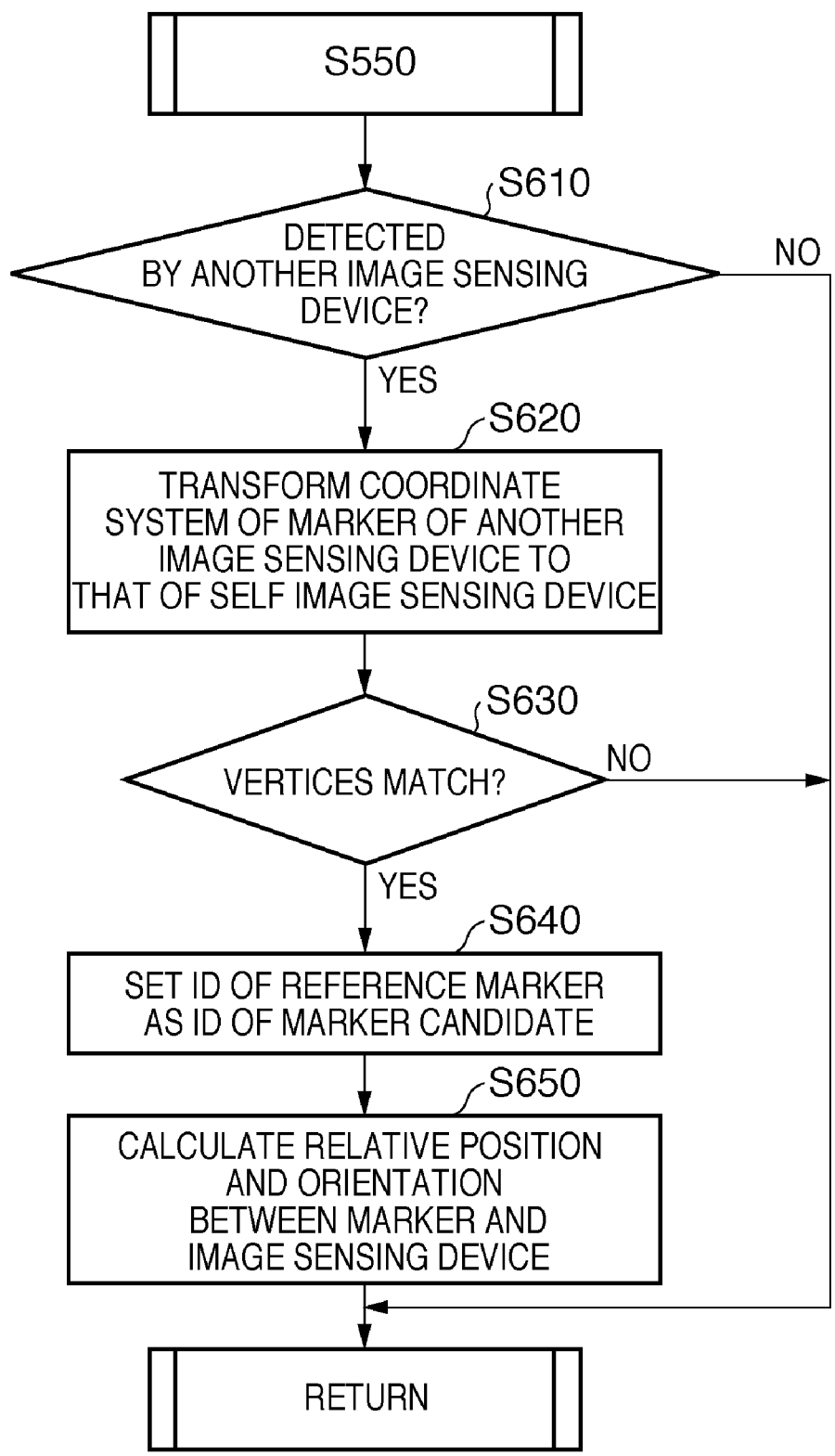
FIG. 6 is a flowchart illustrating details of the process in step S550.

FIG. 6 is a flowchart illustrating details of the process in step S550.

If recognition of the marker 120 has failed in the sensed image obtained by an image sensing device (one of the image sensing devices 110R and 110L), and recognition of the marker 120 has failed in the sensed image obtained by the other image sensing device, the process is ended.

On the other hand, if recognition of the marker 120 has failed in the sensed image obtained by an image sensing device (one of the image sensing devices 110R and 110L), and recognition of the marker 120 has succeeded in the sensed image obtained by the other image sensing device, the process advances from step S610 to step S620.

In step S620, the index cooperative recognition unit 170 transforms the three-dimensional coordinate values Vc of the four vertices of the marker whose recognition has succeeded into the two-dimensional coordinate values Ic' on the sensed image for which marker recognition has failed. Of the thus obtained two-dimensional coordinate values, two points of the coordinate values Ic' of the set of the four vertices of one marker and the two-dimensional coordinate values Ic of the four vertices, which are closest on the image, are selected to make a set. The distance between the two points in the set is obtained. The average value of the distances obtained in the respective sets is calculated.

If the calculated average value is smaller than the threshold value, the process advances from step S630 to step S640. If the calculated average value is equal to or larger than the threshold value, the process is ended.

In step S640, the index cooperative recognition unit 170 determines that the coordinate values Ic' indicate the coordinate values of the four corners of a marker that is the same as the marker having the two-dimensional coordinate values Ic at the four corners. The coordinate values Ic' are registered in the storage unit 140 in association with the ID of the marker.

In step S650, the index cooperative recognition unit 170 recognizes the marker 120 on the sensed image whose recognition has failed based on the above-described processes of the index identification unit 160 using the coordinate values Ic'. The above-described processes of the index identification unit 160 are executed using the recognized marker 120, thereby estimating the relative position and orientation between the marker 120 and the image sensing device which has acquired the sensed image whose recognition has failed. The estimated position and orientation is stored in the storage unit 140 together with the ID of the marker 120.

As described above, according to this embodiment, even when some of the plurality of image sensing devices have caused a "marker detection failure", marker recognition can be done by sharing the marker information of another image sensing device whose relative position and orientation is known.

In this embodiment, the number of image sensing devices is 2. However, three or more image sensing devices may be used. In this case, the above-described process is executed for each image sensing device.

In the first embodiment, a method of dealing with a "marker detection failure" has been described. The second embodiment deals with a "marker recognition error".

The second embodiment is the same as the first embodiment except points to be described below.

Figure 7:
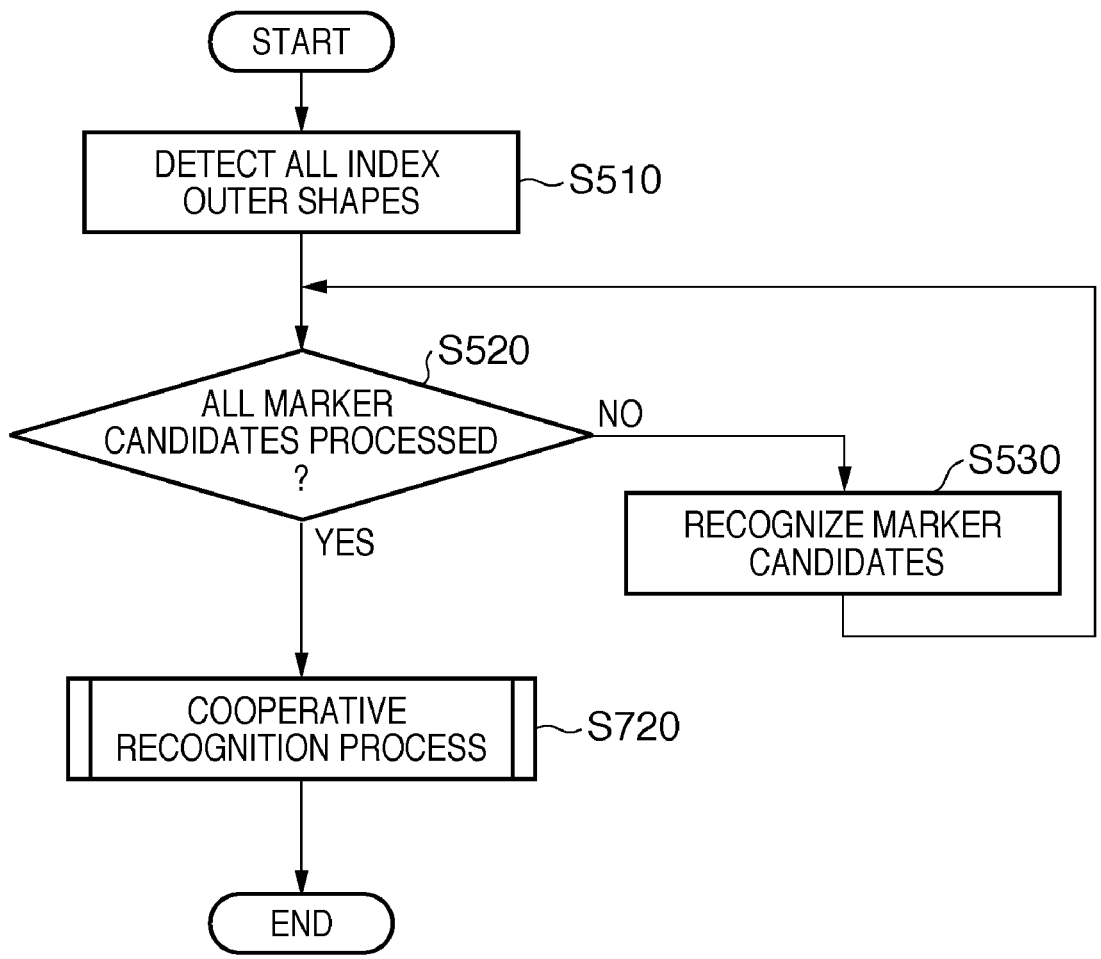
FIG. 7 is a flowchart of a process of recognizing markers in sensed images acquired by the image sensing devices 110R and 110L.

FIG. 7 is a flowchart of a process of recognizing markers in sensed images acquired by image sensing devices 110R and 110L. The process according to the flowchart in FIG. 7 is executed as part of the process of obtaining the position and orientation information of the image sensing devices 110R and 110L using a recognized marker.

In step S720, an index cooperative recognition unit 170 executes a marker recognition process again for a sensed image for which recognition has failed using the pieces of information about a marker whose recognition has succeeded (cooperative recognition process).

Figure 8:
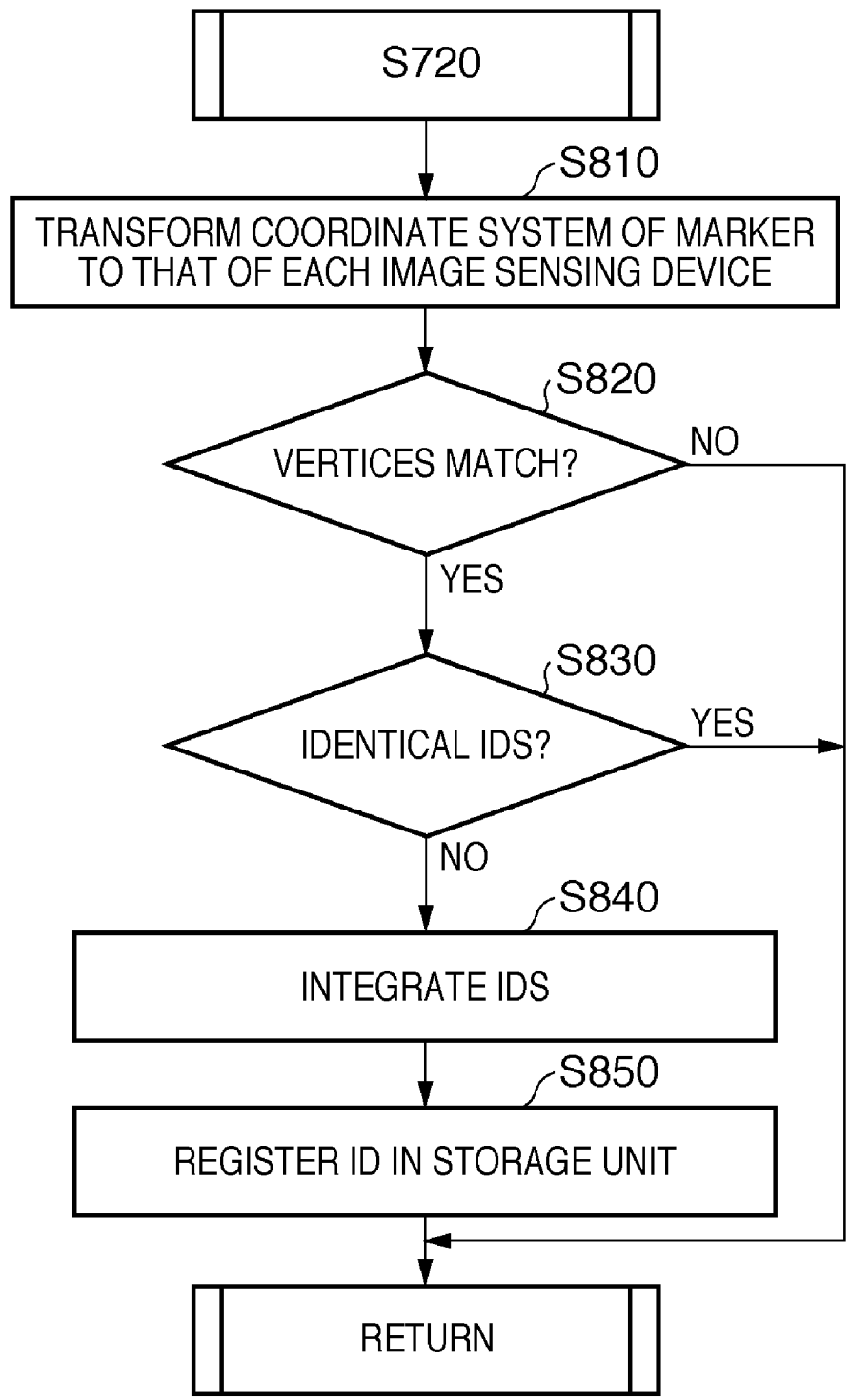
FIG. 8 is a flowchart illustrating details of the process in step S720.

FIG. 8 is a flowchart illustrating details of the process in step S720.

In step S810, the coordinate position of each recognized marker is obtained on a coordinate system based on an image sensing device that is not the image sensing device which has sensed the marker. In FIG. 1, the coordinate position of the marker sensed by the image sensing device 110R is obtained on a coordinate system 210L based on the image sensing device 110L. Additionally, the coordinate position of the marker sensed by the image sensing device 110L is obtained on a coordinate system 210R based on the image sensing device 110R.

In step S820, a coordinate position X of the marker on the coordinate system based on the self image sensing device is associated with a result Y obtained by transforming the coordinate position of the marker on the coordinate system based on the other image sensing device into the coordinate position on the coordinate system based on the self image sensing device. More specifically, two points of the coordinate positions X of the set of the four vertices and the coordinate positions Y of the four vertices, which are closest, are selected to make a set. The distance between the two points in the set is obtained. The average value of the distances obtained in the respective sets is calculated. If the calculated average value is smaller than a threshold value, the process advances to step S830. If the calculated average value is equal to or larger than the threshold value, the process is ended.

In step S830, the ID of the marker at the coordinate position X and the ID of the marker at the coordinate position Y are acquired from a storage unit 140 and compared to determine whether the IDs are identical. If it is determined that the IDs are identical, the process is ended. If it is determined that the IDs are not identical, the process advances to step S840.

In step S840, it is determined that the IDs are not identical because of a marker identification error, and most reliable IDs are selected and integrated. The reliability of an ID is obtained by, e.g., the following method. One of the number of pixels of the identification area of the marker sensed by the image sensing device (the larger value means higher reliability), the depth of the relative orientation between the image sensing device and the marker (the smaller value means higher reliability), and the distance between the image sensing device and the marker (the smaller value means higher reliability), or a combination of two or more of them is used. In this embodiment, the ID of a marker for which the order of the above-described three factors is high in general is regarded to have a high reliability.

In step S850, a marker whose ID is different from the reliable ID obtained in step S840 is regarded as an erroneously recognized marker. The erroneously recognized ID in the storage unit 140 is replaced with the reliable ID.

That is, in the above-described process, if the difference between indices having different pieces of identification information is smaller than a threshold value, the different pieces of identification information are integrated.

As described above, according to this embodiment, even when some of the plurality of image sensing devices have caused a "marker detection error", a correct marker can be recognized by sharing the marker information of another image sensing device whose relative position and orientation is known.

It is also possible to perform accurate estimation by preventing the marker recognition error when obtaining the position and orientation of an image sensing device in the world coordinate system or the position and orientation of a measurement target object in the world coordinate system.

In the above-described embodiments, methods of dealing with a marker recognition failure by detecting a marker from each sensed image and identifying the same marker by marker vertex transformation have been described. Instead, each of identical marker candidate areas (a rectangular area surrounded by bits 320A to 320D) captured by image sensing devices may be projected onto a square by two-dimensional projective transformation (Homography), and the ID of the marker may be recognized from an image obtained by averaging the plurality of projected images. Use of this method makes it possible to moderate noise in image sensing at the time of ID recognition and therefore prevent any marker detection failure or marker recognition error caused by noise.

The third embodiment is the same as the first embodiment except points to be described below.

Figure 9:
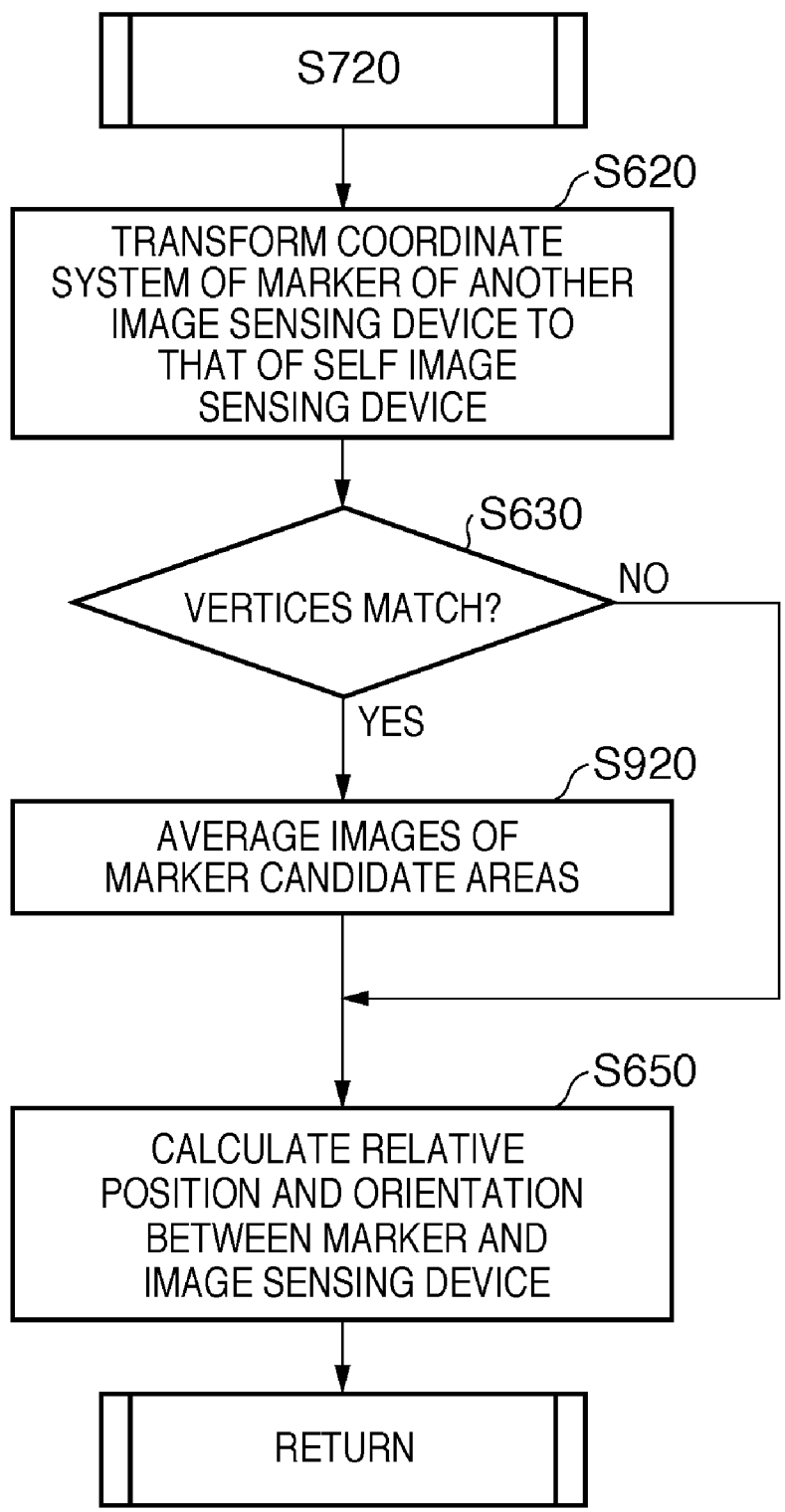
FIG. 9 is a flowchart illustrating details of the process in step S720.

FIG. 9 is a flowchart illustrating details of the process in step S720.

If the average value explained in the first embodiment is smaller than a threshold value, the process advances from step S630 to step S920. If the calculated average value is equal to or larger than the threshold value, the process advances from step S630 to step S650.

In step S920, normalized images T are acquired. The plurality of normalized images T are averaged. More specifically, the pixel values of pixels in the normalized images T are added at the same pixel position. The sum is divided by the number of normalized images T, and the obtained result is defined as the pixel value at the pixel position. An image generated in this way will be called an average normalized image.

After the images are averaged, the ID recognition process in step S530 is executed again, thereby recognizing an ID that could not be recognized due to a marker detection failure caused by the influence of noise or correcting an erroneously recognized ID.

In the third embodiment, a method of preventing a recognition error caused by noise using the averaged normalized image of the normalized images T has been described. Instead, a high-resolution image may be generated from the image information of a normalized image T to cope with a marker recognition error or marker detection failure caused by shortage of resolution.

The fourth embodiment is the same as the first embodiment except points to be described below.

In this embodiment, the process in step S920 is changed as follows.

In step S920, a high-resolution image is generated from the image information of the normalized image T. As the generation method, for example, a technique disclosed in Shin Aoki, "Super Resolution Processing by Plural Number of Lower Resolution Images", Ricoh Technical Report No. 24, NOVEMBER, 1998 is used. More specifically, image data is regarded as a signal, and the signal containing the alias component of the image data is subjected to broadband interpolation using a lowpass filter to increase the density. In addition, a weighted sum is added to the high-density data to cancel the alias distortion and simultaneously reconstruct the high-frequency component of the original signal.

Use of the high-resolution image makes it possible to prevent any recognition error caused by shortage of resolution of the marker candidate area.

This embodiment is not limited to the method using a high resolution, and any method capable of improving the image information of the normalized image T is usable.

In the above-described embodiments, a marker having an ID code area inside a square outer shape is used. However, the marker need not always have an outer shape, and a marker having no outer shape as disclosed in patent reference 1 may be used. More specifically, a marker (second marker) including a rectangular bar, four feature points, and a two-dimensional barcode portion in the feature points may be used.

When the second marker is used, an index outer shape detection unit 150 included in an image processing apparatus 100 is changed to a unit for detecting two-dimensional code data disclosed in patent reference 1. More specifically, a sensed image is binarized, and a black pixel concatenation area is decided. A rectangular logo mark cell portion serving as the reference of a recognition process is detected. Corner cells in a predetermined search range are detected, and the four detected points are registered as bits 320A to 320D.

An index identification unit 160 reads out and identifies the code of the index using the obtained bits 320A to 320D of the corner cells by the method disclosed in patent reference 1.

The remaining processes are the same as in the first embodiment.

In the second embodiment, in the process in step S840, the reliability is calculated based on the factors of the relative position and orientation between the image sensing device and the marker. In place of the factors of the relative position and orientation, the ID list of markers arranged on real space, which is stored in a storage unit 140 in advance, may be acquired to eliminate an erroneously recognized ID. In this embodiment, a method of excluding, as an erroneously recognized ID, an ID which is not present in the ID list is used as a marker ID integration method. This method may be combined with the integration method using the factors of relative position and orientation in the second embodiment. More specifically, in the reliability evaluation process in step S840, if an ID that is not present in the ID list is detected, it is deleted from the ID candidates without performing reliability evaluation.

The arrangement of the marker recognition processing apparatus according to this embodiment is the same as in the first embodiment, and a description thereof will not be repeated.

The procedure of the process in the marker recognition processing apparatus according to this embodiment is different from the process in step S840 of the second embodiment only in that the ID reliability obtaining process changes to a process of comparing an ID with that in the ID list. An erroneously recognized ID is deleted by comparison with the ID list. When one ID is specified finally, it is registered as a reliable ID. If a plurality of ID candidates exist even after deletion of the erroneously recognized ID, the process is ended without integrating the IDs.

The units included in an image processing apparatus 100 shown in FIG. 1 can be formed from hardware. However, the units except a storage unit 140 may be formed from software. In this case, the image processing apparatus 100 needs to have an execution unit which executes the software, and a storage unit which stores the software.

Figure 10:
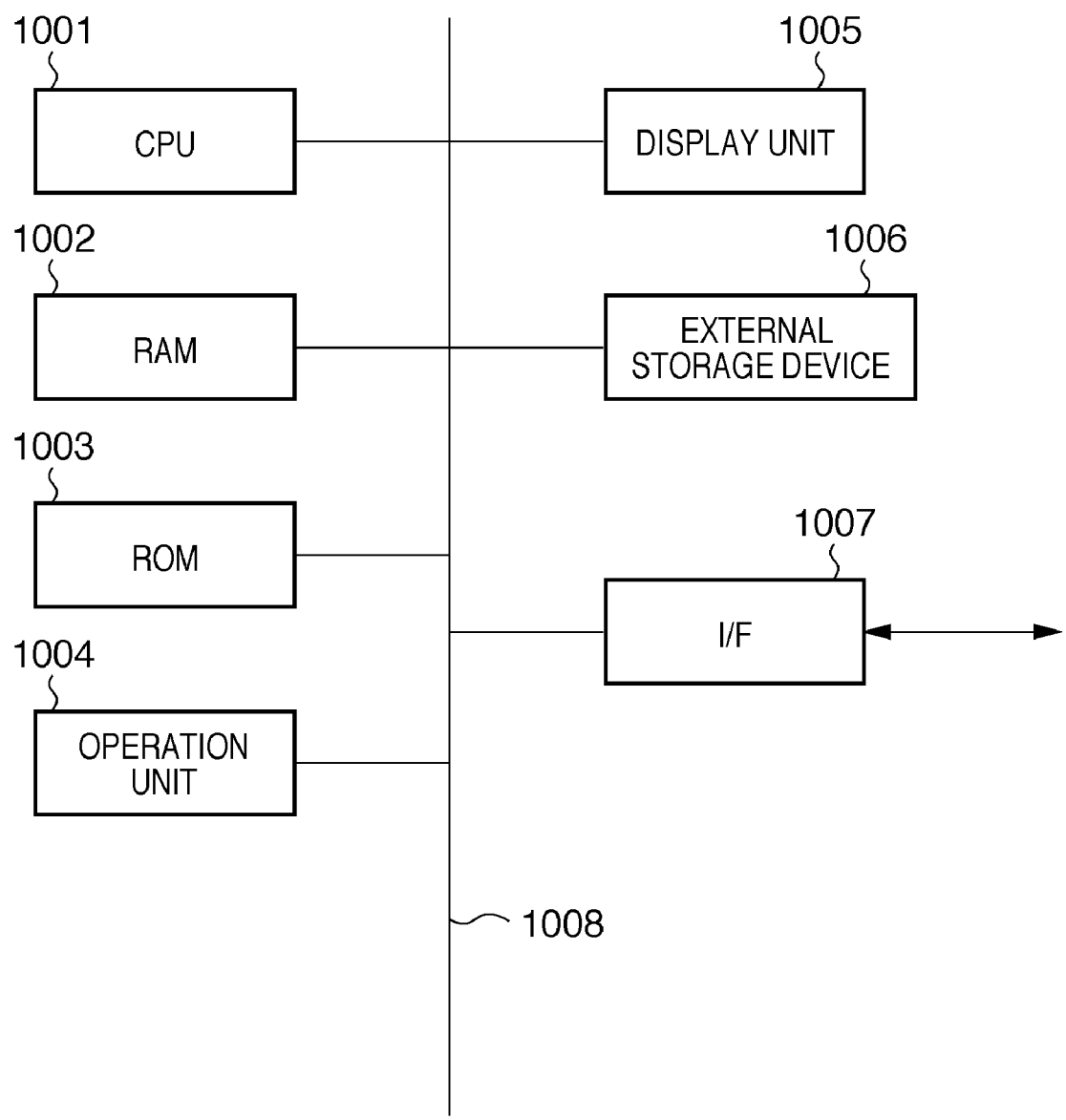
FIG. 10 is a block diagram showing an example of the hardware configuration of a computer applicable to an image processing apparatus 100.

FIG. 10 is a block diagram showing an example of the hardware configuration of a computer applicable to the image processing apparatus 100.

A CPU 1001 controls the entire computer using programs and data stored in a RAM 1002 and a ROM 1003 and also executes the above-described processing of the image processing apparatus 100 to which the computer is applied.

The RAM 1002 has an area to temporarily store programs and data loaded from an external storage device 1006 or data externally received via an I/F (interface) 1007. The RAM 1002 also has a work area to be used by the CPU 1001 to execute various kinds of processing. That is, the RAM 1002 can provide various areas as needed. Note that the RAM 1002 may function as the storage unit 140 in FIG. 1.

The ROM 1003 stores the set data and boot program of the computer.

An operation unit 1004 includes a keyboard and a mouse. The operator of the computer can input various instructions to the CPU 1001 by operating the operation unit 1004.

A display unit 1005 including a CRT or a liquid crystal panel can display the processing result of the CPU 1001 as an image or a text.

The external storage device 1006 is a mass information storage device represented by a hard disk drive. The external storage device 1006 stores the OS (Operating System) and programs which cause the CPU 1001 to execute the functions of an index outer shape detection unit 150, index identification unit 160, and index cooperative recognition unit 170 shown in FIG. 1.

The external storage device 1006 also stores the various kinds of information which have been described as information stored in the storage unit 140. That is, the external storage device 1006 also functions as the storage unit 140.

The programs and data stored in the external storage device 1006 are loaded to the RAM 1002 as needed under the control of the CPU 1001. The CPU 1001 executes processing using the programs and data loaded to the RAM 1002. Hence, the computer can execute the above-described processing of the image processing apparatus 100.

The I/F 1007 functions as an image input unit 130 shown in FIG. 1. Sensed images output from image sensing devices 110R and 110L are input to the external storage device 1006 or RAM 1002 via the I/F 1007.

A bus 1008 connects the above-described units.

The arrangement of the above embodiments is assumed to be an image processing apparatus connected to a plurality of image sensing devices for sensing physical space where a plurality of indices are arranged regardless of its purpose. The major components of the image processing apparatus are as follows. The apparatus includes a calculation unit which performs, for each image sensing device, processing of recognizing an index in a sensed image and obtaining the layout position of the recognized index in a coordinate system based on an image sensing device that has acquired the sensed image. The apparatus further includes a management unit which manages index information including identification information unique to the index and the layout information of the index. The apparatus also includes a varying unit which, if recognition of an index of interest in a sensed image acquired by an image sensing device of interest has failed, or the index has erroneously been recognized, varies the management contents of the index of interest by the management unit on the basis of the result of the calculation unit for a sensed image acquired by an image sensing device other than the image sensing device of interest.

The object of the present invention is also achieved by the following method. A recording medium (or storage medium) which records software program codes to implement the functions of the above-described embodiments is supplied to a system or apparatus. The storage medium is a computer-readable storage medium, as a matter of course. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

The functions of the above-described embodiments are also implemented when the computer executes the readout program codes, and the operating system (OS) running on the computer partially or wholly executes actual processing on the basis of the instructions of the program codes.

Assume that the program codes read out from the recording medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298582, filed Nov. 16, 2007, which is hereby incorporated by reference herein in its entirety.

What is claimed is:

1. An image processing apparatus connected to a plurality of image sensing devices each of which senses physical space where a plurality of indices are arranged, comprising:
   a calculation unit which, for each image sensing device, recognizes an index in a sensed image and calculates layout information of the recognized index in a coordinate system based on an image sensing device that has acquired the sensed image;
   a management unit which manages index information including identification information unique to the index and the layout information of the index; and a setting unit which, if recognition of a first index in a first sensed image acquired by a first image sensing device has failed, or the first index has erroneously been recognized, sets the index information of the first index managed by said management unit on the basis of the layout information of the first index calculated by said calculation unit for a second sensed image acquired by a second image sensing device other than the first image sensing device.

2. The apparatus according to claim 1, wherein said calculation unit recognizes the first index in the first sensed image acquired by the first image sensing device and calculates the layout information of the recognized index in a coordinate system based on the first image sensing device, and if said calculation unit has failed in recognizing another index in another sensed image acquired by another image sensing device except the first image sensing device, said setting unit calculates layout information of the other index in a coordinate system based on the other image sensing device using position and orientation relationship information representing a relative position and orientation relationship between the first image sensing device and the other image sensing device and layout information of the other index calculated by said calculation unit for the first image sensing device.

3. The apparatus according to claim 2, wherein said calculation unit calculates a difference between layout information of a self index in the first sensed image acquired by the first image sensing device in a self coordinate system based on the first image sensing device and a result obtained by transforming layout information of the index in the sensed image acquired by said other image sensing device except the first image sensing device in another coordinate system based on the other image sensing device into layout information in the self coordinate system, and if the difference between indices having different pieces of identification information is smaller than a threshold value, said management unit integrates the different pieces of identification information.

4. The apparatus according to claim 1, further comprising a unit which calculates position and orientation information of each image sensing device using layout information obtained for the image sensing device.

5. The apparatus according to claim 1, wherein said calculation unit sums an area of the index in the sensed image for each sensed image, normalizes the summation result, and recognizes the index using the normalized summation result.

6. The apparatus according to claim 1, wherein said calculation unit recognizes the index using a result obtained by performing broadband interpolation using a lowpass filter for an area of the index in the sensed image to increase a density, and adding a weighted sum to high-density data to cancel an alias distortion and reconstruct a high-frequency component in the area.

7. An image processing method executed by an image processing apparatus connected to a plurality of image sensing devices each of which senses physical space where a plurality of indices are arranged, comprising:

recognizing, for each image sensing device, an index in a sensed image and calculating layout information of the recognized index in a coordinate system based on an image sensing device that has acquired the sensed image;

managing index information including identification information unique to the index and the layout information of the index; and if recognition of a first index in a first sensed image acquired by a first image sensing device has failed, or the first index has erroneously been recognized, setting the managed index information of the first index on the basis of the layout information of the first index for a sensed image acquired by a second image sensing device other than the first image sensing device.

8. A non-transitory computer-readable storage medium storing a program which causes a computer to execute the image processing method of claim 7.

* * * * *